United States Patent [19]

Cameron, Jr.

[11] Patent Number: 4,811,962
[45] Date of Patent: Mar. 14, 1989

[54] HOLDER FOR MACHINING THIN WALLED CYLINDER

[76] Inventor: G. N. Cameron, Jr., 873 Briar Ct., Rochester, Mich. 48063

[21] Appl. No.: 674,413

[22] Filed: Nov. 23, 1984

[51] Int. Cl.[4] .......................... B23B 5/22; B23Q 3/08
[52] U.S. Cl. ...................... 279/2 A; 269/22
[58] Field of Search ............... 242/72 B; 269/22, 48.1; 279/2 A; 294/93, 98.1

[56] References Cited

U.S. PATENT DOCUMENTS

| | | | |
|---|---|---|---|
| 3,507,507 | 4/1970 | Tobler et al. | 279/2 A |
| 3,553,795 | 1/1971 | McDougal | 294/93 |
| 3,595,555 | 7/1971 | Cameron | 269/22 |
| 3,677,559 | 7/1972 | Andre et al. | 279/1 Q |
| 3,762,730 | 10/1973 | Cameron | 242/72 B |
| 3,904,144 | 9/1975 | Gattrugeri | 279/2 A |
| 4,200,301 | 4/1980 | Ryan | 279/2 A |
| 4,366,735 | 1/1983 | Dubois, Sr. | 279/2 A |
| 4,502,703 | 3/1985 | Rohm | 279/2 A |

*Primary Examiner*—Gil Weidenfeld
*Assistant Examiner*—Gary F. Paumen
*Attorney, Agent, or Firm*—Lloyd M. Forster

[57] ABSTRACT

Hydraulically actuated arbor for finish machining thin walled cylinder such as internal combustion cylinder liner without deflecting from initial free state out-of-round condition including flexible Teflon displacement shell and accurately adjustable means for displacement.

14 Claims, 2 Drawing Sheets

HOLDER FOR MACHINING THIN WALLED CYLINDER

BACKGROUND OF THE INVENTION

This walled cylindrical workpieces, such as internal combustion engine cylinder liners, are frequently distorted in heat treat to a slightly out-of-round condition.

Removal of finishing stock for the internal diameter involves holding the workpiece in a chuck, or for the external diameter, holding the workpiece on an arbor. Expansion arbors and contracting chucks are well known in the art as applied to relatively rigid workpieces which are not deflected significantly by the holding pressure. However, as applied to thin walled relatively flexible workpieces, a conventional chuck or arbor may deflect the workpiece from its out-of-round condition to a true round cylindrical configuration during the finishing operation. This will establish a true round cylindrical finish surface to final external or external diameter while held by the chuck or arbor but subject to spring back to an out-of-round condition upon removal from the process tooling.

Such remaining out of round condition of the final workpiece may result either where the finishing operation is limited to only one of the external or internal surfaces or where both surfaces are successively finished by final turning, boring or grinding operations.

If the workpiece is to be ultimately mounted with accurate fit within a rigid member, such as an engine block in the case of a cylinder liner, the out-of-round condition may be remedied upon installation by conformity to the rigid member. However, even in the case of cylinder liners, preferred practice involves finishing operations which correct the out-of-round condition for the workpiece in its free state. This involves the requirement for holding the workpiece in a chuck or on an arbor without deflection from its out-of-round condition while finishing stock is removed from one of the external or internal surfaces. If the second surface is then also finished, it may then be held with conventional cylindrical tooling with resulting free state true cylindrical configuration.

One basic approach to providing an arbor or chuck which will hold a thin walled workpiece without deflection from its slightly out-of-round condition is disclosed in U.S. Pat. No. 3,677,559 as a hydrostatic holding device which employs a relatively plastic sleeve, in either internal or external holding units, or pliant material such as nylon which is relatively soft compared to metal parts which are to be clamped, the concept being a sleeve material which will conform to the surface conditions of the part being held and exert pressure thereon without changing the shape of the part. Such patent discloses in the drawings and specification an external chuck type holding unit employing a flexible nylon sleeve of either uniform thickness or of a varying thickness adapted to conform to varying external diameters of the workpiece.

BRIEF DESCRIPTION OF THE PRESENT INVENTION

Applicant has found, in the development of an arbor employing a flexible expandible Teflon shell, that a uniform shell thickness adequate for end sealing, such as through lip seals seated in circumferential arbor grooves, results in excessive stiffness of the shell for expansion into full holding contact with a cylinder liner without deflection from its initial out-of-round condition. An important improvement in function was found to result from the provision of a Teflon shell having a uniform OD with ends engaged by lip seals where the shell thickness is approximately double the intermediate thickness where expansion and clamping contact takes place. Such shell mounted on a cylindrical arbor having a central hydraulic passage leading to one or more radial passages communicating with the central clamping portion of the Teflon shell provides superior results with no significant deflection of the cylinder liner when subjected to exterior finishing operations.

Employment of a compression spring in the arbor bore, through which hydraulic fluid is fed to the Teflon shell, reacting against a probe for displacing and pressurizing the hydraulic fluid has been found to assure release of the workpiece for free removal.

Extending beyond the relatively heavy sealed ends of the Teflon shell, a reduced diameter provides an external shoulder for axial confinement of the shell by ends caps having light press fit on the extensions.

DETAILED DESCRIPTION OF THE PREFERRED EMBODIMENT

Figure 1:
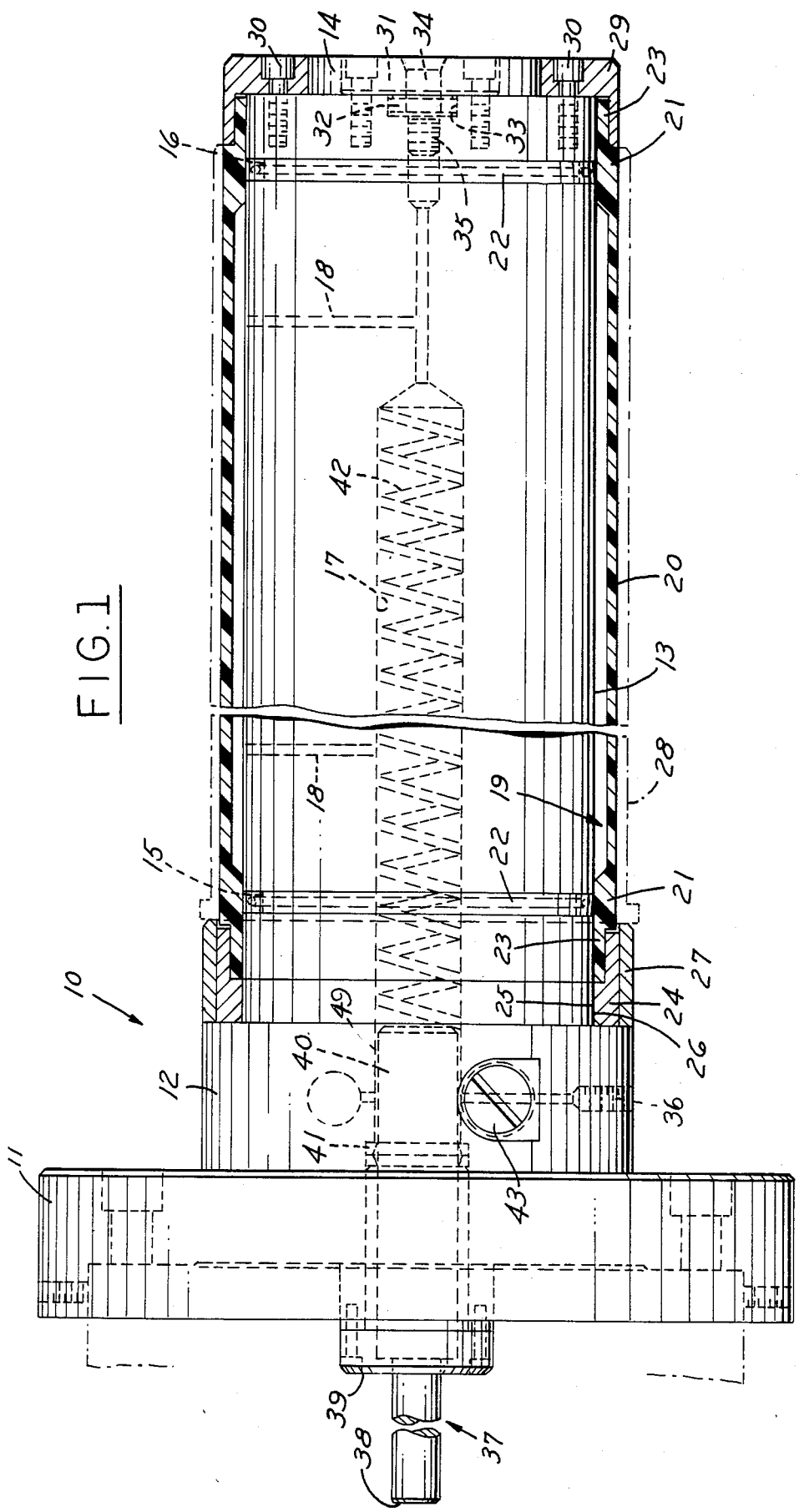
FIG. 1 is a sectional side elevation of an arbor assembly constructed in accordance with the present invention.
Figure 2:
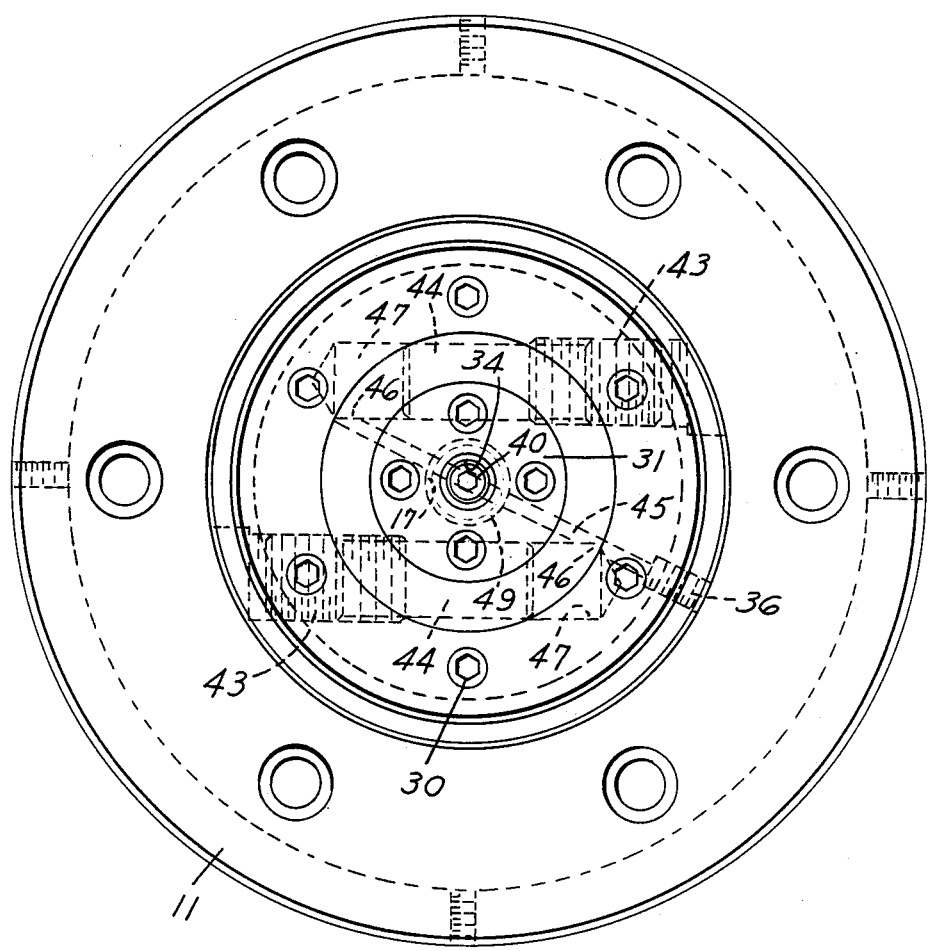
FIG. 2 is an end view of the arbor shown in FIG. 1.

With reference to FIG. 1, rigid integral body 10 includes mounting flange 11, preload adjustment section 12, Teflon shell pilot section 13, and cap pilot end 14. Circumferential seal groove 15 and outboard seal groove 16 together with hydraulic bore 17 and one or more cross passages 18 are provided in cylindrical pilot 13.

Teflon shell 19 is provided with a relatively thin clamping wall 20, relatively thick sealed ends 21 engaged by lip seals 22, and shouldered reduced end extensions 23 which are press fit on both surfaces within rear shell retainer 24 and on body shell pilot 13. The thicker end portions 21 are also provided with a light press fit on pilot surface 13.

Rear shell retainer 24 at its inner diameter 25 is provided with a press fit on adjacent surface 26 which is slightly larger in diameter than pilot surface 13, e.g. approximately 0.001", to accommodate assembly of retainer 24 over pilot surface 13. Stop ring 27 is in turn press fit on retainer 24 serving to engage the end of the workpiece 28 which, in the embodiment shown, comprises a thin walled cylinder liner.

Front shell retainer 29 likewise provides a press fit on adjacent extension 23 and is assembled to the end of arbor pilot section 13 by cap screws 30. Turning center 31, press fit at 32 within pilot recess 33, includes passage 34 providing access to axial bleeder 35 which, together with radial bleeder 36, accommodates complete bleeding of air from all internal hydraulic passages and chambers.

Hydraulic fluid is displaced to actuate Teflon shell 20 by probe 37 extending into bore 17 actuated by external control tooling engaging end 38 through an actuating stroke limited by cover surface 39 thus providing displacement of dowl rod 40, sealed at 41 within bore 17. Compression spring 42 returns probe 37 upon release of actuating pressure to a release position of Teflon shell 20.

Dual adjusting screws 43 acting on plungers 44 communicating with cross passage 45 at intersections 46 with chambers 47 and with bore 17 through clearance around rod 40 as shown at 49, typically in the order of 1/32" in diameter, provide means when the unit is fully bled for varying the effective displacement of Teflon shell 20 in reaching full engagement with the out-of-round internal surface of cylinder liner workpiece 29 thus providing an accurate means for initial regulating, and adjustment if and when required, in the pressurized holding force of the Teflon shell under full stroke actuation of probe 37. Since it is highly desirable to hold the workpiece with sufficient torque to prevent slipping under tool loads, without causing deflection from its out-of-round condition incident to excessive pressures, accurate adjustment of the hydraulic displacement is a critical feature of the disclosed arbor.

Any leakage from the unit would of course objectionably decrease the Teflon shell actuation displacement defeating such accurate adjustment. Accordingly the provision of lip seals 22 on relatively rigid ring portions 21 of Teflon shell 20, and the supplemental seal provided by press fit of both surfaces of extensions 23 with the rear and front shell retainers, also serve as a critically important function in the disclosed embodiment. The relative rigidity of the heavier ring sections 21 also contribute to stabilizing the effective axis of rotation of the workpiece against displacement or vibration which would be incident to a uniform thin section.

The arbor may be completely assembled prior to filling with hydraulic fluid, preferably accomplished in a horizontal attitude with one of the adjustment screws 43 and plunger removed and rotated to a vertical axis position. Air is bled out through bleeders 35 and 36 changing the attitude of the arbor to provide rising passages from all hydraulic chambers and by repeatedly cycling the probe to eliminate all air bubbles.

Displacement provided by stroke of the probe is calculated to expand the Teflon shell from a relaxed state in which the workpiece may be placed over the arbor, with a slip non-deflecting fit against stop 27, to an expanded position for holding the workpiece. Initial try-out of such displacement may be made with the adjustment screws 43 and plungers 44 in a mid position after all air bleeding has been completed. Initial cycling of probe 37 may take place without the workpiece in position measuring the expanded diameter for preliminary setting through adjustment screws 43. With the workpiece in place, further cycling and adjustment will provide an accurate setting of required sleeve displacement and minimum pressure for dependably holding the workpiece without deflection in order to achieve the desired result of finishing its exterior surface to an accurate free state cylindrical surface.

I claim:

1. Holder for finish machining thin walled cylindrical workpiece hydraulically actuated with minimum workpiece deflection from initial out-of-round free state characterized by rigid cylindrical body, relatively thin walled flexible plastic cylindrical sleeve held by said body, means for introducing actuating hydraulic fluid between said sleeve and body to effect sleeve displacement into workpiece holding engagement, and relatively thick annular extremities of said sleeve engaging said cylindrical body on either side of said thin sleeve wall with annular sealing means interposed between adjacent cylindrical surfaces of said thick extremities and said rigid cylindrical body to retain said actuating hydraulic fluid against leakage.

2. Holder of claim 1 including means for establishing pilot engagemet between said relatively thick annular extremities and the ends of said workpiece preparatory to hydraulic holding actuation.

3. Holder of claim 1 wherein said relatively thick annular extremities provide hydraulic fluid cavity space between said body and said sleeve.

4. Holder of claim 3 wherein the outer surface of said sleeve extends as a substantially continuous cylindrical surface of constant diameter throughout the workpiece engaging length.

5. Holder of claim 1 including displaceable probe means for actuating said hydraulic fluid.

6. Holder of claim 1 including fixed stroke displaceable probe means for actuating said hydraulic fluid, said probe means having fixed stroke.

7. Holder of claim 1 including fixed stroke displaceable probe means for actuating said hydraulic fluid, and spring probe return means for releasing actuating hydraulic pressure.

8. Holder of claim 6 including adjustable hydraulic fluid displacement means for adjusting the extent of actuation of said sleeve by said fixed stroke probe means.

9. Holder of claim 1 including end extensions of said sleeve over said body beyond said sealed relatively thick annular extremities x and retainer means engaging said end extensions on their exterior surface dimensioned to establish a press fit between said retainer means, extensions, and body.

10. Holder of claim 8 including an attachment flange integrally connected to said body with said probe means extending axially beyond said flange for external mechanical actuation.

11. Holder of claim 10 including a collar portion of said body interposed between said flange and sleeve, said collar including said adjustment means with adjustable hydraulic fluid chambers.

12. Holder of claim 5 including a body for use as an arbor, a central hydraulic chamber communicating with the relatively thin walled flexible portion of said sleeve, said probe means extending into said chamber.

13. Holder of claim 12 including an end cap for said body with a tool center therein, a central passage leading from said center to said chamber and bleeding means installed in said passage.

14. Holder of claim 13 including bleeding means communicating with the ends of said adjustment chambers.

* * * * *